United States Patent [19]
Ishii et al.

[11] Patent Number: 5,070,293
[45] Date of Patent: Dec. 3, 1991

[54] ELECTRIC POWER TRANSMITTING DEVICE WITH INDUCTIVE COUPLING

[75] Inventors: Naoki Ishii, Handa; Toshikazu Ina, Nagoya; Koji Mori, Oobu; Katsunori Ito, Aichi; Shigenori Asai, Okazaki, all of Japan

[73] Assignees: Nippon Soken, Inc., Nishio, Japan; Nippondenso Co., Ltd., Kariya, Japan

[21] Appl. No.: 487,032

[22] Filed: Mar. 2, 1990

[30] Foreign Application Priority Data

Mar. 2, 1989 [JP] Japan ................... 1-50544

[51] Int. Cl.$^5$ ................ H02J 7/04; H01M 10/46; H01F 27/28
[52] U.S. Cl. ................... 320/2; 336/DIG. 2; 336/225
[58] Field of Search .............. 320/2; 336/DIG. 2, 225

[56] References Cited

U.S. PATENT DOCUMENTS

| 3,277,358 | 10/1966 | Nicholl | 320/2 X |
| 3,938,018 | 2/1976 | Dahl | 320/2 |
| 4,143,417 | 3/1979 | Wald et al. | 364/900 |
| 4,251,798 | 2/1981 | Swartz et al. | 235/462 X |
| 4,360,798 | 11/1982 | Swartz et al. | 340/146.3 AG |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,460,120 | 7/1984 | Shepard et al. | 235/472 |
| 4,496,831 | 1/1985 | Swartz et al. | 235/472 |
| 4,556,837 | 12/1985 | Kobayashi et al. | 320/2 |
| 4,593,186 | 6/1986 | Swartz et al. | 235/472 |
| 4,607,156 | 8/1986 | Koppenaal et al. | 235/472 |
| 4,673,805 | 6/1987 | Shepard et al. | 235/472 |
| 4,736,095 | 4/1988 | Shepard et al. | 235/472 |
| 4,758,717 | 7/1988 | Shepard et al. | 235/472 |
| 4,760,248 | 7/1988 | Swartz et al. | 235/472 |
| 4,801,786 | 1/1989 | Stobbe | 235/472 X |
| 4,806,742 | 2/1989 | Swartz et al. | 235/472 |
| 4,808,804 | 2/1989 | Krichever et al. | 235/462 |
| 4,816,660 | 3/1989 | Swartz et al. | 235/472 |
| 4,816,661 | 3/1989 | Krichever et al. | 235/472 |
| 4,825,057 | 4/1989 | Swartz et al. | 235/472 |
| 4,835,374 | 5/1989 | Swartz et al. | 235/472 |

FOREIGN PATENT DOCUMENTS 59-176339 11/1984 Japan .
62-119101 7/1987 Japan .
62-260526 11/1987 Japan .

Primary Examiner—R. J. Hickey
Attorney, Agent, or Firm—Cushman, Darby & Cushman

[57] ABSTRACT

An electric power transmitting device transmits electric energy from one coil to another coil through an inductive coupling therebetween. One of the coils has an end bent in the axial direction of the coil. When the other coil is to be inserted into said one coil, it can be inserted in not only the axial direction of said one coil, but also a direction transverse to the axial direction through the bent end of the coil. Said one of the coils is typically housed in a holder, and the other coil in the grip of a gun-shaped, hand-held bar-code scanner. When the grip is inserted into a groove defined in the holder, the coils are magnetically coupled to each other, thus providing an inductive coupling. The bar-code scanner can easily be placed on and removed from the holder.

11 Claims, 4 Drawing Sheets

ELECTRIC POWER TRANSMITTING DEVICE WITH INDUCTIVE COUPLING

BACKGROUND OF THE INVENTION

1. Field of the Invention

The present invention relates to an electric power transmitting device having a pair of coils for transmitting electric power through an inductive coupling.

2. Prior Art

One known electric power transmitting device having a pair of coils is disclosed in Japanese Laid-Open Patent Publication No. 62(1987)-260526.

As shown in FIG. 7A of the accompanying drawings, the disclosed device includes a case 201 having a recess 201a and a case 202 having a projection 202a with a core 205 disposed therein. A primary coil 203 is disposed around the recess 201a and connected to an AC power supply 206, and a secondary coil 204 is connected to a secondary battery 207. When the core 205 is inserted through both the primary coil 203 and the secondary coil 204, the primary and second coils 203, 204 are magnetically coupled intensively to obtain a sufficient efficiency of electric power transmission therebetween. The secondary battery 207 is charged by electric power supplied from the AC power supply 206 through an inductive coupling provided by the coils 203, 204.

It has also been proposed to position the secondary coil 204 within the primary coil 203 for a sufficient efficiency of electric power transmission therebetween, as illustrated in FIG. 7B.

The cases 201, 202 of the conventional electric power transmitting device are however complex since the recess 201a and the projection 202a have to be formed in and on the respective cases 201, 202. The projection 202a on the case 202 requires a sufficient mechanical strength against possible damage due to impacts.

If the case 202 in which the secondary battery 207 is constructed as a grip, then the electric power transmitting device cannot easily be handled since the core 205 or the secondary coil 204 can only be inserted in the axial direction of the primary coil 203. Therefore, the user may tend to feel awkward when trying to magnetically couple the primary and secondary coils 203, 204 and hence to fail to charge the secondary battery 207. Accordingly, the voltage stored in the secondary battery 207 is likely to be used up and not re-charged.

SUMMARY OF THE INVENTION

In view of the aforesaid drawbacks of the conventional electric power transmitting device, it is an object of the present invention to provide an electric power transmitting device which include primary and secondary coils that can easily be positioned relatively to each other for an intensive magnetic or inductive coupling.

Another object of the present invention is to provide an electric power transmitting device having primary and secondary coils which are disposed in one plane for the transmission of electric power therebetween through an inductive coupling, and which can be manipulated with greater freedom without any substantial loss in the efficiency of electric power transmission.

Still another object of the present invention is to provide a manually operable device which can be supplied with electric power through an inductive coupling provided by primary and secondary coils, and which can be manipulated with ease without any substantial loss in the efficiency of electric power transmission.

Yet another object of the present invention is to provide a gun-shaped, hand-held bar-code scanner which can be supplied with electric power through an inductive coupling provided by primary and secondary coils, and which can be manipulated with ease without any substantial loss in the efficiency of electric power transmission.

According to the present invention, an electric power transmitting device includes a pair of coils which provide a electromagnetic or inductive coupling. One of the coils has an end bent in the axial direction of the coil. When the other coil is inserted into said one coil, it can be inserted in not only the axial direction of said one coil, but also a direction transverse to the axial direction through the bent end of the coil. When a component housing said one coil is to be fitted into another component housing the other coil, it can be manipulated easily with great freedom. When said one coil is inserted into the other coil, they are disposed in substantially one plane for an intensive inductive coupling therebetween.

According to another aspect of the present invention, a first coil is housed in the grip of a gun-shaped, hand-held bar-code scanner, and a second coil is housed in a holder for the bar-code scanner. When the grip is inserted into a groove defined in the holder, the first and second coils are magnetically coupled to each other, thus providing an inductive coupling. The grip can be inserted into the groove in at least two directions. Therefore, the bar-code scanner can easily be placed on and removed from the holder, and hence can be manipulated with ease. The second coil is disposed along and around the groove, so that the first and second coils are magnetically coupled intensively to each other.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
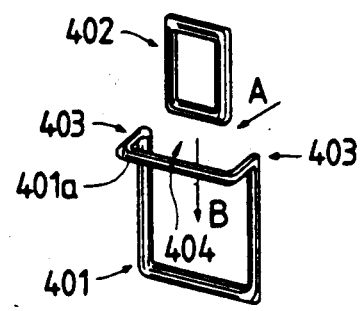
FIG. 1 is a perspective view schematically showing the principles of the present invention.

Like or corresponding parts are denoted by like or corresponding reference numerals throughout views.

FIG. 1 schematically shows a basic coil arrangement according to the present invention. In FIG. 1, a primary coil 401 is of a substantially rectangular shape and has one longitudinal end 401a bent at a right angle in a direction parallel to the axial direction of the primary coil 401, i.e., the direction normal to the plane of the primary coil 401. The bent end 401a of the primary coil 401 defines an opening 404. A secondary coil 402 is also rectangular in shape and smaller than the primary coil 402. When the secondary coil 402 is to be combined with the primary coil 401 for a magnetic or inductive coupling, the secondary coil 402 can be inserted into the primary coil 401 in the direction indicated by the arrow A or through the opening 404 in the direction indicated by the arrow B.

Figure 2:
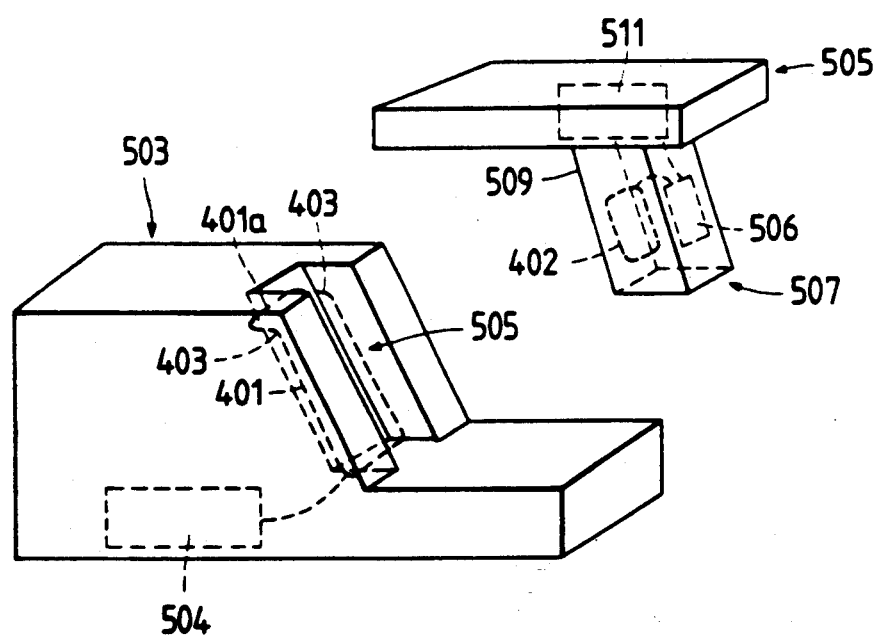
FIG. 2 is a perspective view of an electric power transmitting device according to a first embodiment of the present invention.

FIG. 2 shows an electric power transmitting device according to a first embodiment of the present invention, which employs such primary and secondary coils 402, 403. The electric power transmitting device shown in FIG. 2 is incorporated in a bar-code reader which comprises a gun-shaped, hand-held bar-code scanner 505 and a holder 503 for holding the bar-code scanner 505. The bar-code scanner 505 includes a handle or grip 507 which houses therein the secondary coil 402, a rectifier unit (not shown), and a power supply unit 506 comprising a secondary battery. The holder 503 houses therein the primary coil 401 and an electric power transmitter 504.

The electric power transmitter 504 supplies the primary coil 401 with an electric current, such as an alternating current, whose magnitude varies with time. When the primary coil 401 is supplied with such an electric current, the number of magnetic fluxes in a magnetic field generated by the primary coil 401 varies, and hence the secondary coil 402 which is electromagnetically coupled to the primary coil 401 induces electromotive forces. Therefore, an electric current corresponding to the induced electromagnetic forces flows through the secondary coil 402, thereby supplying electric power to the power supply unit 506 to charge the secondary battery. The electric power transmitter 504 includes a controller for detecting the charged condition of the secondary battery, and reducing the changes in the magnitude of the current supplied to the primary coil 401 when it is detected that the secondary battery is fully charged, so that the magnitude of electric power supplied to the power supply unit 506 will be reduced. The controller of the electric power transmitter 504 can also detect whether the bar-code scanner 505 is placed on the holder 503 or not. The electric power transmitter 504 supplies the current to the primary coil 401 only when the bar-code scanner 505 is put on the holder 503.

The secondary battery 506 serves to supply electric power to an electric component 511 in the bar-code scanner 505. The electric component 511 may comprise, for example, a laser diode, a scanning mirror drive motor, and an associated electric circuit. Therefore, the bar-code scanner 505 is of a cordless arrangement and can be energized by the self-contained power supply, i.e., the secondary battery 506.

The grip 507 of the bar-code scanner 505 has a front outer wall 509. The secondary coil 402 which is housed in the grip 507 is disposed parallel and adjacent to the front outer wall 509. The holder 503 has an obliquely vertical groove 505 which is shaped to receive a front portion of the grip 507. The primary coil 401 which is housed in the holder 503 is positioned along the groove 505 with the bent end 401a extending transversely around the groove 505 near its upper end. When the grip 507 is placed in the groove 505, the primary coil 401 and the secondary coil 402 are disposed in one plane lying parallel to the longitudinal axis of the groove 505. Since the primary coil 401 has the bent end 401a, as shown in FIGS. 1 and 2, the secondary coil 402 can be inserted into the primary coil 401 in the axial direction of the primary coil 401, i.e., in the direction normal to the longitudinal axis of the groove 505, and also in the direction normal to the axial direction of the primary coil 401, i.e., in the direction parallel to the longitudinal axis of the groove 505. Accordingly, the bar-code scanner 505 can easily be manipulated when it is to be placed on or picked up from the holder 503. The groove 505 of the holder 503 is not deep enough to fully accommodate the grip 507 as shown in FIG. 2. Therefore, the grip 507 can easily be inserted into and removed from the groove 505. In addition, the holder 503 can simply be designed and manufactured.

Figure 3A:
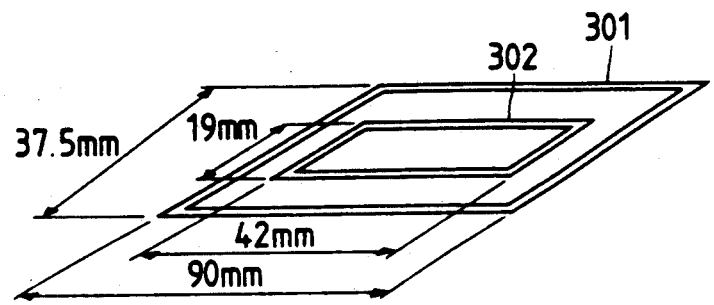
FIGS. 3A and 3B are perspective views of the primary and secondary coils of a conventional electric power transmitting device and the primary and secondary coils of the first embodiment of the invention, respectively, the coils being tested for the comparison of efficiencies of electric power transmission.
Figure 3B:
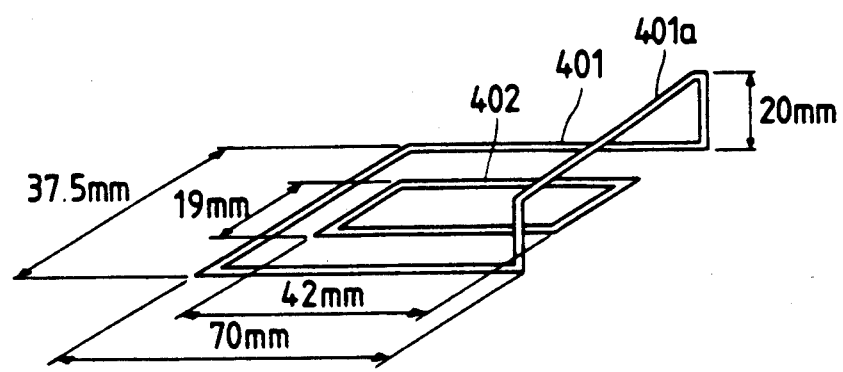

FIG. 3A shows the primary and secondary coils 301, 302 of a conventional electric power transmitting device, and FIG. 3B shows the primary and secondary coils 401, 402 of the electric power transmitting device of the invention. These coils were tested for the comparison of efficiencies of electric power transmission in order to determine any adverse effect which the bent end 401a of the primary coil 401 shown in FIGS. 1 and 2 may have on the efficiency of electric power transmission. The primary coil 301 shown in FIG. 3A had a length of 90 mm, a width of 37.5 mm, a wire diameter of 0.5 mm, and 60 turns, whereas the secondary coil 302 had a length of 42 mm, a width of 19 mm, a wire diameter of 0.2 mm, and 100 turns. The primary and secondary coils 401, 402 shown in FIG. 3B are identical in structure to the coils 301, 302, except that the bent end 401a of the primary coil 401 is 70 mm spaced from the other end. The results of the test indicated that the efficiencies of electric power transmission of the conventional and inventive coils were about 15% and not appreciably different from each other.

Figure 4:
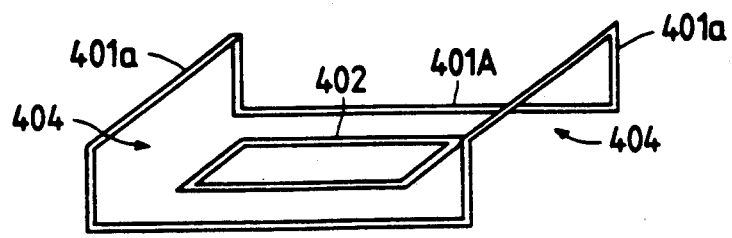
FIG. 4 is a perspective view of the primary and secondary coils of an electric power transmitting device according to a second embodiment of the present invention.

FIG. 4 shows the primary and secondary coils of an electric power transmitting device according to a second embodiment of the present invention. The primary coil, denoted at 401A, has two opposite bent ends 401a which define respective openings 404 parallel to each other. Therefore, the secondary coil 402 can be inserted into the primary coil 401A through the openings 404 in any of the two directions normal to the axis of the primary coil 401A. Therefore, the secondary coil 402 can be inserted into the primary coil 401A with greater freedom as to the directions in which it is inserted, and can be manipulated more easily.

In the first and second embodiments, the secondary coil 402 is inserted into the primary coil 401 or 401A through the opening or openings 404 of the primary coil 401 or 401A. However, the secondary coil may have an opening or openings defined by an end or ends thereof, and the primary coil may be inserted into the secondary coil through the opening thereof.

Figure 5:
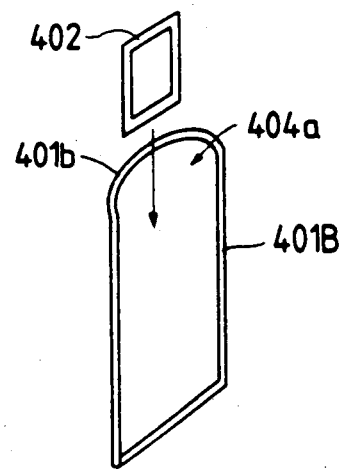
FIG. 5 is a perspective view of the primary and secondary coils of an electric power transmitting device according to a third embodiment of the present invention.

According to a third embodiment shown in FIG. 5, one end of a primary coil 401B has an arcuately curved end 401b defining an arcuate opening 404a through which the secondary coil 402 can be inserted into the primary coil 401B.

Figure 6:
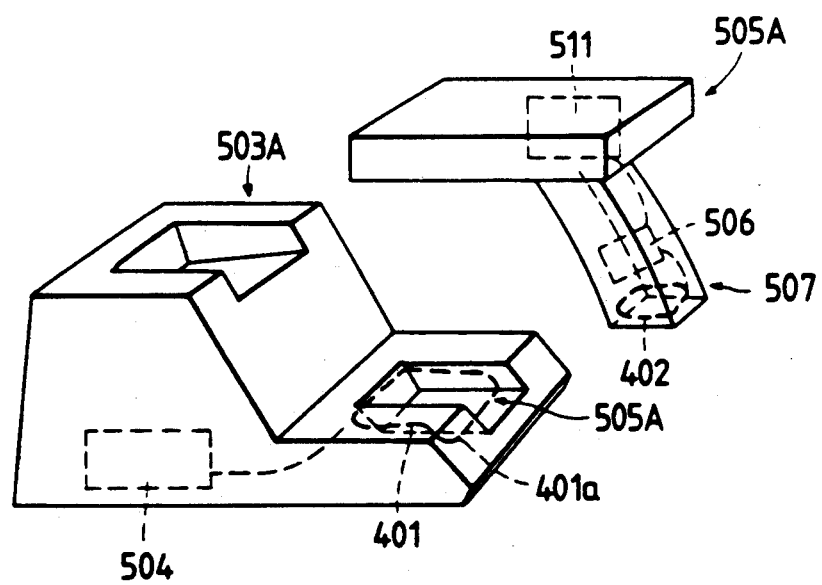
FIG. 6 is a perspective view of an electric power transmitting device according to a fourth embodiment of the present invention.
Figure 7A:
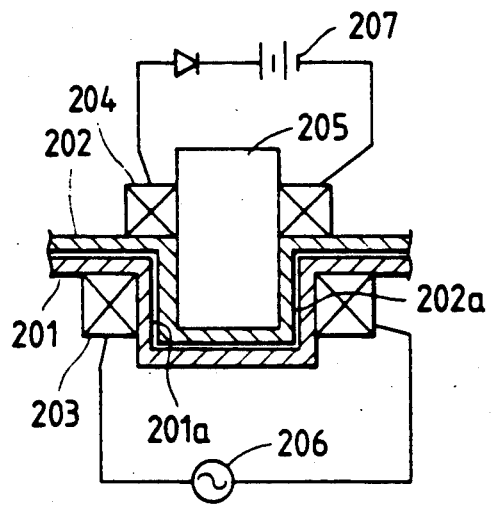
FIGS. 7A and 7B are sectional views of conventional inductive chargers.
Figure 7B:
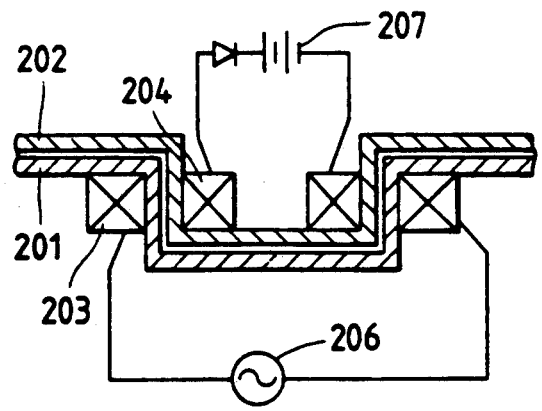

FIG. 6 shows an electric power transmitting device according to a fourth embodiment of the invention. The electric power transmitting device shown in FIG. 6 includes a gun-shaped, hand-held bar-code scanner 505A having a grip 507 which houses therein a secondary coil 402 disposed on the bottom thereof. The electric power transmitting device also has a holder 503A having a horizontal groove 505A for receiving a lower portion of the grip 507. A primary coil 401 is housed in the holder 503A and disposed along the groove 505A with its bend end 401a extending transversely around the groove 505A near one end thereof.

Although certain preferred embodiments have been shown and described, it should be understood that many changes and modifications may be made therein without departing from the scope of the appended claims.

What is claimed is:

1. An electric power transmitting device comprising:
   a first coil;
   a second coil which can be combined with said first coil to provide an inductive coupling therebetween;
   means for supplying a current which is variable in magnitude with time to said first coil to induce an electric current across said second coil through said inductive coupling;
   one of said first and second coils having a bent portion extending along the axial direction of one of the coils;
   the other of said first and second coils being insertable into said one of the coils through said bent portion; and
   the arrangement being such that said first and second coils can be disposed in substantially one plane, and said other of the coils can be moved into and out of said one of the coils in the axial direction of said one of the coils and in a direction transverse to said axial direction.

2. An electric power transmitting device according to claim 1, wherein said one of the coils is of a rectangular shape, said bent portion being on one longitudinal end of said one coil.

3. An electric power transmitting device according to claim 2, wherein said one of the coils has another bent portion extending along the axial direction of said one of the coils, said other bent portion being on the other longitudinal end of said one coil.

4. An electric power transmitting device according to claim 1, wherein said bent portion comprises an arcuately curved portion.

5. A manually operable device and holder combination comprising:
   a manually operable device;
   a first coil disposed in said manually operable device;
   a secondary battery disposed in said manually operable device and electrically chargeable by an electric current induced across said first coil;
   a holder for holding said manually operable device;
   means defining a groove in said holder, said manually operable device being insertable into said groove in two substantially perpendicular directions;
   a second coil disposed in said holder along said groove, said second coil having a bent portion extending transversely around said groove, said bent portion being bent in one of said two substantially perpendicular directions; and
   an electric power transmitter for supplying said second coil with an electric current which varies in magnitude with time.

6. A manually operable device and holder combination according to claim 5, wherein said manually operable device includes a grip, said first coil being housed in said grip and disposed along a side surface thereof, said groove extending obliquely vertically for receiving said side surface of the grip, said bent portion being disposed near one end of said groove.

7. A manually operable device and holder combination according to claim 5, wherein said manually operable device includes a grip, said first coil being housed in said grip and disposed along a bottom surface thereof, said groove extending horizontally for receiving said bottom surface of the grip, said bent portion being disposed near one end of said groove.

8. A hand-held bar-code scanner and holder combination comprising:
   a gun-shaped hand-held bar-code scanner having a grip;
   a first coil disposed in said grip of the bar-code scanner;
   a secondary battery disposed in said bar-code scanner and electrically chargeable by an electric current induced across said first coil;
   a holder having a groove therein for holding said grip of the bar-code scanner,
   said grip of the bar-code scanner being insertable into said groove in at least two substantially perpendicular directions;
   a second coil disposed in said holder along said groove, said second coil having a bent portion extending transversely around said groove, said first and second coils being positioned in substantially one plane when said grip is received in said groove; and
   an electric power transmitter for supplying said second coil with an electric current which varies in magnitude with time.

9. A hand-held bar-code scanner and holder combination according to claim 8, wherein said first coil is disposed along a side surface of said grip, said groove extending obliquely vertically for receiving said side surface of the grip, said bent portion being disposed near one end of said groove.

10. A hand-held bar-code scanner and holder combination according to claim 8, wherein said first coil is disposed along a bottom surface of said grip, said groove extending horizontally for receiving said bottom surface of the grip, said bent portion being disposed near one end of said groove.

11. A hand-held bar-code scanner and holder combination according to claim 8, wherein said bent portion is bent in one of said two substantially perpendicular directions.

* * * * *